May 24, 1960 P. R. ADAMS ET AL 2,938,204
AERIAL NAVIGATION INDICATOR
Filed Sept. 8, 1958 2 Sheets-Sheet 1
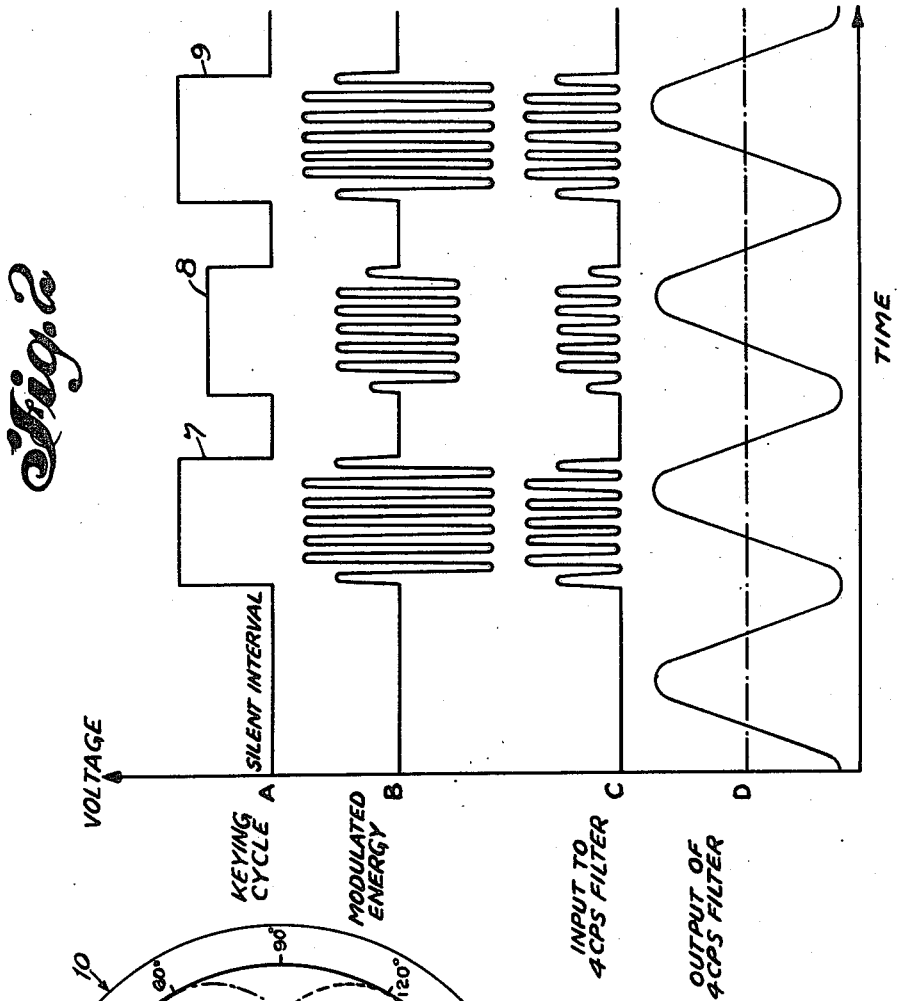
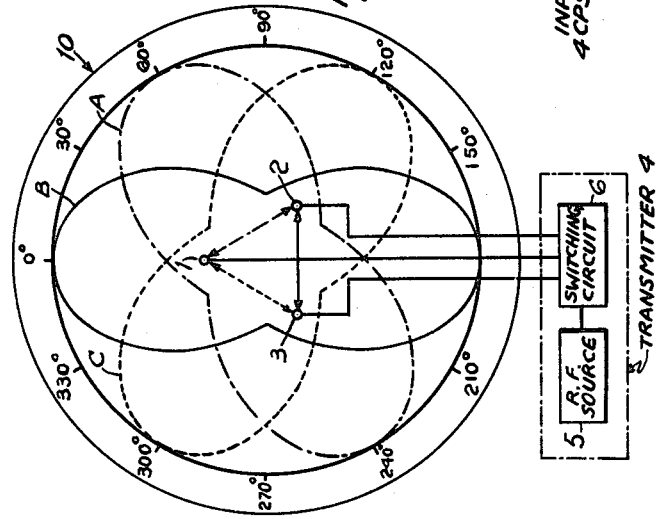
Inventors
PAUL R. ADAMS
BEN ALEXANDER
ROBERT I. COLIN
By Philip M. Bolton
Attorney Inventors
PAUL R. ADAMS
BEN ALEXANDER
ROBERT I. COLIN
By Philip M. Bolton
Attorney

United States Patent Office

2,938,204
Patented May 24, 1960

2,938,204
AERIAL NAVIGATION INDICATOR

Paul R. Adams, Bethesda, Md., and Ben Alexander and Robert I. Colin, Nutley, N.J., assignors to International Telephone and Telegraph Corporation, Nutley, N.J., a corporation of Maryland Filed Sept. 8, 1958, Ser. No. 759,513

9 Claims. (Cl. 343—102)

This invention relates to aerial navigation system indicators and more particularly to an improved indicator system for use with a Navaglobe radio range beacon. This is a continuation in part of our copending application Serial No. 382,934, filed September 29, 1953 (now abandoned).

The Navaglobe radio range beacon system provides a radio beacon consisting essentially of three transmitting antennas arranged in an equilateral triangle with means provided to successively energize the antennas in pairs so that different distributions of the energy are produced in different directions about the beacon. At the beginning of each cycle of antenna pair energization, a synchronizing signal is provide so that receiving means in an aircraft or other vehicle may synchronize the signals from the antenna pairs to establish its bearing relative to the beacon. One such beacon and receiver arrangement is shown in Patent No. 2,541,040, issued February 13, 1951, to R. I. Colin. As shown in the Colin patent and also as originally employed in the Navaglobe system, a characteristic Navaglobe synchronizing signal consisting of a radiated pulse or group of pulses is radiated omnidirectionally at one cycle per second and serves to mark the start of the cycle of the three directional signals from the three pairs of antennas. However, this use of a synchronizing signal has been modified to eliminate the synchronizing pulses and a silent interval is employed to mark the start of each cycle. Thus, the radiated signals from the pairs of antennas are received at a craft or vehicle and the silent intervals serve to synchronize a distributor control so that the successively received signals from the pairs of antennas may be utilized to indicate the craft's bearing relative to the beacon.

In the past, the received signals were applied to different windings of a three coil vector ratio meter whose needle assumed a position depending upon the vector sum of the fields developed in the three coils. Although this meter performed satisfactorily it did possess some disadvantages. For instance, considerable direct current power was required to produce the magnetic field necessary to control the ratio meter needle and the needle was susceptible to external D.C. magnetic influence. In addition, each meter required an individual calibration after installation. Furthermore, the detector system utilized a linear detection method which incurred D.C. errors in the indicator due to noise and this D.C. error, usually referred to as cumulative noise error, produced a "set" in the indicator that varied with the noise level and azimuth.

One of the objects of this invention is to provide an improved Navaglobe indicator which overcomes the aforementioned disadvantages by utilizing a trigonometric coupling device or "resolver," which preferably operates with alternating current, and a sensitive null detection device associated therewith.

Another object of this invention is to utilize a square law detection method in a Navaglobe indicator system to diminish error due noise.

It is another object to employ servo mechanisms for computing the bearing in a Navaglobe system having self-contained servo loops which transform improper settings of shaft angles directly into A.C. error voltages to energize correcting servo motors and to provide an alarm to warn when the system is not in synchronization.

It is a feature of this invention to provide a bearing indicating system which accepts the Navaglobe signals from a receiver and routes the information signals through two different routes to a drag cup motor which acts as a square law device, the first route being to a trigonometric coupling device via a distributor which distributes the three information signals to predetermined coils of said device and the other route being via a 90 degree phase shifter. Each of the routes are coupled to different coils of a drag cup motor so that the shaft output rate of the motor represents the square of the information signals. This shaft position output is then detected and converted to an electrical signal by means of, for example, a "Synchrotel" and during the silent interval this electrical signal is fed to a servo motor which drives the rotor of the trigonometric coupling device until the output from the "Synchrotel," during the silent interval, is nulled. Thus, when the output of the "Synchrotel" is nulled and the position of the trigonometric coupling device rotor is representative of bearing.

The "Synchrotel" which converts the shaft output from the drag cup motor to an equivalent electrical signal is a well-known item manufactured by the Kollsman Company and consists of a shaft position input to a first rotor inductively coupled with three stator windings 120° out-of-phase with each other. These windings are electrically coupled with three other stator windings also 120° out-of-phase with each other which are in turn inductively coupled with a second rotor. In the embodiment hereindescribed, this second rotor is driven by a servo. In operation, the first rotor detects a shaft position offering very little frictional or other resistance to said shaft position and the second rotor produces an electrical signal for energizing a servo motor which, in turn, drives the second rotor until its output electrical signal is nulled. Thus, when in the null condition, the position of the second rotor is indicative of the position of the first rotor. The "Synchrotel" is particularly useful in the embodiment hereindescribed, although other devices could be substituted therefore to yield the same result.

The trigonometric coupling device may use resistive inductive or capacitive effects. The input signals may be applied to three individual members of this device and the output taken from a common member, as in the embodiment hereindescribed, or the reverse procedure may be used. Furthermore, either the three individual members or the common member may be physically rotated in order to produce the desired variations. A feature of this coupling device is that the input Navaglobe signals whose relative amplitudes contain the azimuth information are subject to the trigonometrical manipulation effect as a function of the rotated member of the device. For illustrative purposes, in the following description of a specific embodiment of this invention, the trigonometric coupling device is assumed to consist of a stator whose members are three coils or windings whose axes are 120° apart and a rotor coil inductively coupled to said three stator coils; the whole device being referred to as a resolver.

Other features and objects of this invention will become more apparent by reference to the following specific description taken in conjunction with the accompanying drawings; in which:

Fig. 1 illustrates the general arrangement of a Navaglobe radio beacon together with a field pattern distribution which may be expected for one form of Navaglobe system;

Fig. 2 is a graphical representation of waveforms helpful in explaining the operation of the indicator system of this invention;

Figure 3:
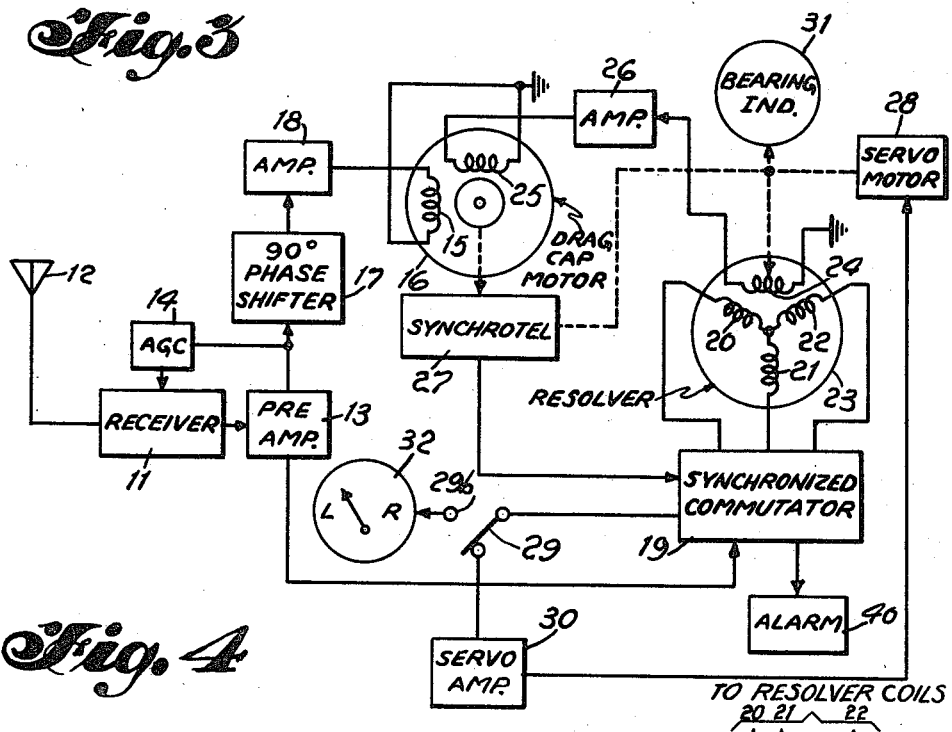
Fig. 3 is a schematic diagram in block form of one embodiment of a receiver incorporating the indicator system of this invention.

Referring to Fig. 1, there are represented typical field patterns which may be produced by antennas 1, 2 and 3. The transmitter 4 is shown to comprise a radio frequency transmitting source 5 and switching circuit 6. Switching circuit 6 is coupled to antennas 1, 2 and 3 so as to energize the antenna cyclically in four steps. In the first step, none of the antennas are energized for one quarter of the cycle, effectively producing a gap or interval which may be considered as a synchronizing signal (see Fig. 2, curve A). Antenna pairs 1, 2; 2, 3 and 3, 1 are then each successively energized by switching circuit 6 for periods represented by pulses 7, 8 and 9 of Fig. 2, curve A. When antennas 1 and 2 are energized, preferably cophasally, the radiation pattern shown in dot-dash lines at A will be produced. Successively thereafter, antennas 2, 3 will be energized producing pattern B and antennas 3, 1 producing pattern C. Thus, it will be seen as indicated by the scale 10 that a difference amplitude ratio of energies from patterns, A, B and C will be produced about the beacon. It will be seen that only 180° ambiguity exists. This ambiguity can be resolved readily by ascertaining the geographical position of the craft or may be resolved by direction finding on two or more beacons or other radiation points to locate generally the position of the craft.

Referring now to Fig. 3 the improved Navaglobe indicator system of this invention is shown wherein a receiver 11 (which is preferably of the super-heterodyne type but without a detector) and which may be mounted on any mobile craft or other location at which it is desired to ascertain the azimuthal position relative to the beacon, receives from antenna 12 some of the energy radiated by the beacon shown in Fig. 1. Receiver 11 is preferably tunable to different transmitting stations and yields an IF output signal preferably at 1500 cycles. Thus, the output energy from receiver 11 is simply the undetected IF which has the forms shown at B in Fig. 2 and consists of an IF wave of 1500 cycles modulated by the characteristic Navaglobe keying cycle shown in Fig. 2, curve A. This output from the receiver is applied via a preamplifier 13 to AGC circuit 14, which in turn, controls the gain of receiver 11. This automatic gain circuit is extremely slow acting in order not to disturb the amplitude ratio of the three Navaglobe signals within any one cycle. Another output from preamplifier 13 is fed to coil 15 of drag cup motor 16 via 90° phase shifter 17 and amplifier 18 while a third output from preamplifier 13 is fed to synchronized commutator device 19.

The purpose of synchronized commutator 19 is to feed each of the three Navaglobe signals within a cycle to a different one of the stator coils 20, 21 or 22 of trigonometric resolver 23. Since the three signals are sequential as shown in the waveforms of Fig. 2, rotor coil 24 of resolver 23 will be sequentially energized by the three signals within a cycle. The signal induced in rotor coil 24 is fed to stator coil 25 of drag cup motor 16 via amplifier 26. Thus, the two stator coils 15 and 25 of drag cup motor 16 are simultaneously energized by the same Navaglobe signal, except that the signal fed to coil 15 is shifted 90° in phase relative to the signal fed to coil 25. When both stator coils of drag cup motor 16 are energized, the torque on the output shaft of the motor is the product of the energizing signal. Consequently, in the embodiment of this invention hereindescribed, this torque is the square of the Navaglobe signals additionally multiplied by the sign of the rotor angle of resolver 23 due to the transformation action of the resolver. It is this squaring action that provides square law detection to the system and if the resolver were eliminated from the circuit, the drag cup rotor would receive three successive impulses of torque, all in the same direction, and proportional to the square of each received Navaglobe signal in a cycle. This squaring action of the drag cup motor serves to reduce noise in the system.

The shaft output from drag cup motor 16 is applied to "Synchrotel" 27. This "Synchrotel" unit is a brushless, low inertia control transformer usually employed to transmit electrical signals representing the difference between two input motions. The "Synchrotel" is manufactured by the Kollsman Company and is described in their catalog number M-90-1000-11-5. It has two rotors and two sets of stator coils with corresponding coils on each set of stator coils being coupled together and is here employed in conjunction with a servo motor energized by the signal induced in one of the rotors of the same rotor. The input rotation to the "Synchrotel" which is followed by the action of the servo motor, is applied to the brushless, low inertia rotor of the "Synchrotel." Thus, in this invention, as shown in Fig. 3, the shaft output from the drag cup motor is applied to the low inertia rotor of the "Synchrotel" 27 and the other rotor of the "Synchrotel" is driven by a servo motor 28 which is responsive to the signal output from that same other rotor via a switch in synchronized commutator 19, switch 29 and servo amplifier 30.

Servo motor 28 also drives bearing indicator 31 and rotor coil 24 of trigonometric resolver 23. Thus, a twofold action is performed by servo motor 28. The first is to null the electrical output from "Synchrotel" 27 by positioning a rotor of the "Synchrotel" to follow the shaft output of drag cup motor 16 during the silent interval. The other function is to position rotor coil 24 of resolver 23, during the silent interval, so that the three signals sequentially induced in rotor coil 24 by the Navaglobe signals applied to stator coils 20, 21 and 22 of resolver 23, will sum up to zero over the cycle. When this occurs it is evident that the three rotations of the shaft output of drag cup motor 16 during the same Navaglobe cycle will add up to zero, provided bearing to the Navaglobe beacon has not changed. Thus, by sensing the "Synchrotel" electrical output during the silent interval following the Navaglobe cycle and driving both the "Synchrotel" 27 and the resolver 23 to null the output of the "Synchrotel" during that silent interval, the shaft positions of the drag cup motor, the "Synchrotel," the resolver and the servo motor will all represent the relative bearing from the antenna 12 to the Navaglobe beacon. Switch 29 and left-right deviation indicator 32 are provided for operating the system to indicate deviation from a preset bearing. For example, the position of rotor coil 24 is set at a desired bearing and switch 29 is set at its terminal 29b, whereupon the signal from "Synchrotel" 27 during the silent interval energizes left-right indicator 32 instead of servo motor 28 and left-right deviations in bearing relative to that set on indicator 31, are indicated.

Figure 4:
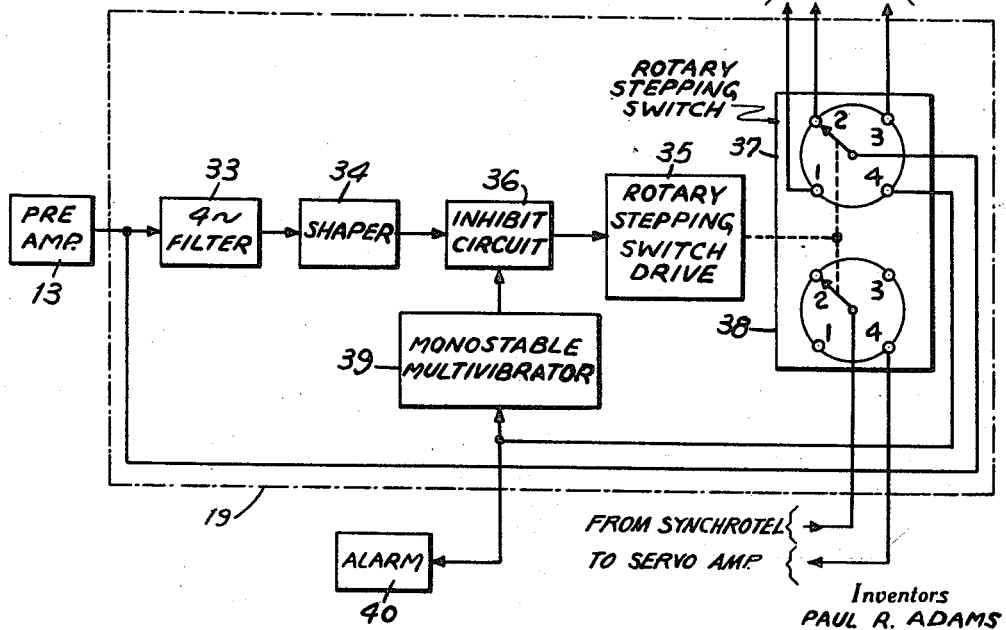
Fig. 4 is a detailed block diagram of the commutator unit employed in Fig. 3.

Referring next to Fig. 4 there is shown the details of synchronized commutator 19, which includes a four-cycle high Q filter amplifier 33 responsive to the rectified output of preamplifier 13 shown in Fig. 2, curve C. The purpose of filter 33 is to detect the four-cycle signal component of the transmitted energy from the beacon producing a four-cycle sine wave such as shown in Fig. 2, curve D. This four-cycle sine wave is then fed to shaper 34 which shapes it into a positive swinging square wave for energizing stepping switch drive 35. Inhibit circuit 36 is inserted between shaper 34 and drive 35 so that pulses from the shaper may be prevented from energizing the switch drive causing it to skip as is required to achieve synchronization. Switch drive 35 drives two sets of rotary switches 37 and 38. When the system is in synchronization the output from preamplifier 13 consisting of the three Navaglobe signals at 1500 cycles is coupled to the rotating arm of switch 37 and fed to three terminals of said switch which are coupled to the three coils 20, 21 and 22 of trigonometric resolver 23. The fourth terminal of switch 37 is coupled to the input of monostable multivibrator 39. When in synchronization, this fourth terminal detects the silent interval and thus provides no signal to multivibrator 39, however, when not in snychronization, this fourth terminal detects one of the three Navaglobe signals and, thus, triggers the multivibrator. Each time it is triggered multivibrator 39 provides an output signal of sufficient duration to block the next square wave pulse from shaper 34 so that switch drive 35 skips a step. This process continues until the silent interval arrives when switch 37 is on its fourth terminal and the system is in synchronization. A second rotary switch 38 is provided to feed the electrical output from "Synchrotel" 27 to servo amplifier 30 during the silent interval and alarm 40 which is coupled to the fourth terminal of switch 37 is energized whenever the system is not in synchronization. Alarm 40 may be any sort of audible or visual alarm having a period of about one second following an energization signal.

Referring to Fig. 2 there is shown the various waveforms helpful in understanding this invention. The intermediate frequency output from receiver 11 comprising a 1500 c.p.s. voltage modulated by the characteristic Navaglobe keying cycle is shown in Fig. 2, curve B, and is applied to preamplifier 13 whose output is directed into two channels. The first output is directed to drag cup motor 16 via phase shifter 17 and the second is put through high Q four-cycle filter amplifier 33. The high Q of filter 33 enables the silent interval to "coast through" so that the output of the filter is essentially a four-cycle per second sine wave as shown in Fig. 2, curve D. This output is then applied to shaping circuit 34 which has its operating point so selected that the four-cycle filter output voltage will drive it from full conduction to a non-conducting condition resulting in a square wave output. Rotary stepping switch drive 35 and rotary switches 37 and 38 may be forward acting rotary stepping switches of the type commonly employed in telephone switching circuits and respond quite readily to energizations occurring at a rate at four-times a second.

As mentioned hereinabove, there is no action of the bearing measuring system when the rotor angle of trigonometric resolver 23 is set properly and consequently there is no net motion of the drag cup motor rotor as measured during the silent interval. However, if the rotor angle of the resolver 23 is not set properly, then there will be a net motion of the drag cup rotor and this net motion sensed during the silent interval will drift causing servo motor 28 to drive during each silent interval until the rotor angle of resolver 23 is set properly. For example, if the rotor of resolver 23 is set off to the right then the drag cup rotor will also drift towards the right in its net motion and if the rotor angle of the resolver is set improperly to the left, then the net motion of the drag cup motor rotor will be adrift towards the left. In other words, the drag cup motor stores sequential signals in the form of rotations yielding the sum of these signals during the silent interval and the net motion of the drag cup motor representative of this sum is a detector of the improper or proper setting of the resolver rotor. The drag cup motor is used merely as a servo detector to provide error voltage when the resolver rotor is not set properly. As also mentioned hereinabove the drag cup motor is an electromechanical device whose torque is proportional to the product of currents flowing in its stator windings. It is filled with a silicon damping fluid and hence it rotates slowly during the application of voltages to its field coils. One such drag cup motor is manufactured by Clifton Precision Products Corporation of Philadelphia, Pennsylvania.

While we have described above the principles of our invention in connection with specific apparatus, it is to be clearly understood that this description is made only by way of example and not as a limitation to the scope of our invention as set forth in the objects and accompanying claims.

We claim:

1. In a radio beacon system having a beacon with cyclinically and successively transmitted signals in a plurality of differently directed radiation patterns and a synchronizing signal, an indicating receiver comprising means for sensing said synchronizing signal, a trigonometrical coupling device having stator and rotor members, means for coupling energy defining said different radiation patterns to said coupling device, means under control of said sensing means for selecting energy from said coupling device in accordance with the timing of said different radiation patterns, the summation null of the outputs of said coupling device being determined by the position of said rotor member, a null sensing device and means to couple the selected outputs of said coupling device to said sensing device whereby the null indication of said null sensing device is indicative of the rotor position when the rotor position represents the bearing of said receiver with respect to said beacon.

2. A radio beacon system having a beacon which cyclically and successively transmits signals in a plurality of differently directed radiation patterns and a synchronizing interval, an indicating receiver comprising means for sensing said synchronizing interval, a trigonometrical coupling device having stator and rotor members, means for coupling energy defining different radiation patterns to said coupling device, means under control of said sensing means for providing energy from said coupling device in accordance with the timing of said different radiation patterns, the summation null of the outputs of said coupling device being determined by the position of said rotor member, a meter to indicate said rotor position and means to rotate the rotor member of said coupling device, a null sensing device and means to couple the outputs of said coupling device to said null sensing device whereby the null indication of said sensing device is indicative of the rotor position represented by said meter which represents the bearing of said receiver with respect to said beacon.

3. A radio beacon system having a beacon which cyclically and successively transmits signals in a plurality of differently directed radiation patterns and a synchronizing interval, an indicating receiver comprising means for detecting said radiation, a trigonometrical coupling device having a rotor and stator members, synchronizing means coupling said detector to said coupling device, means to square the output of said coupling device and store signals therefrom during a cycle, motor means for driving said rotor member, sensing means coupling the output of said squaring and storage means to said motor means during said synchronizing interval whereby said motor means is energized to drive the rotor of said trigonometrical coupling device until a null is produced at the output of said sensing means.

4. In a radio beacon system having a beacon which cyclically and successively transmits signals in a plurality of differently directed radiation patterns following a synchronizing interval, a bearing indicating receiver comprising means for detecting said radiations, a trigonometrical coupling device, synchronizing means coupled to the output of said receiver for applying signals representing each of said radiation patterns to elements of said coupling device, signal squaring and storage means coupled to the output of said trigonometrical coupling device and also to the output of said receiver, motor means for positioning said coupling device, comparing means coupled to the output of said squaring and storage means and also coupled to the output of said motor drive means for comparing the output of said squaring and storage means with said motor means output and producing a signal for energizing said motor means during said synchronizing interval so that said motor means is energized during said interval driving said trigonometrical coupling device to a position representative of bearing.

5. In a radio beacon system having a beacon which cyclically and successively transmits signals in a plurality of differently directed radiation patterns and a synchronizing interval, an indicating receiver comprising means for sensing said differently directed signals in said synchronizing interval, a trigonometrical coupling device, a synchronized commutator device coupling said receiver to said trignometrical coupling device having rotor and stator members, motor means for driving said rotor member, signal storage means coupled to said receiver and to the output of said rotor member and switching means coupling the output of said storage means to said motor so that said motor drives said rotor member to null the output from said storage means and bearing indicating means coupled to the output of said motor means.

6. A radio beacon system and receiver indicator for indicating a bearing of said receiver relative to said beacon comprising a beacon which cyclically and successively transmits signals in a plurality of differently directed radiation patterns followed by a synchronizing interval, an antenna for detecting said radiations, a receiver coupled to said antenna, a resolver comprising stator members and a rotor member, a sychronized commutator coupling the output of said receiver to said stator members, a drag cup motor having two stator members and a rotor member, phase shifting means coupling the output of said receiver to one of said drag cup stator members, means coupling the output of the rotor member of said resolver to another drag cup stator member, a low inertia control transformer, driven by said drag cup motor and said motor drive means producing an error signal and synchronized switching means coupling said error signals to said motor drive means during said synchronizing interval so that said resolver rotor is driven to a position representative of bearing.

7. A system as in claim 6, and further including selector means for fixing the position of said motor drive and said resolver rotor and supplying said error signal to a null indicator to indicate deviations from the bearing represented by the fixed position of said motor drive.

8. A system as in claim 6, wherein said synchronized commutator includes filter means coupled to the output of said receiver producing a sine wave at the fundamental frequency of the radiations from said beacon, signal shaping means coupled to the output of said filter, a rotary stepping switch, gating means coupling the output of said shaper to said rotary stepping switch, means coupling the output of said receiver to the first rotating arm of said stepping switch, means coupling said error signal to the second rotating arm of said stepping switch, means coupling predetermined terminals associated with said first rotating arm to stator members of said resolver, a multivibrator means coupling another of said first terminals to said multivibrator supplying a control signal to said gate, and means coupling a predetermined one of said second set of terminals to said motor drive means.

9. A system as in claim 8, further including alarm means coupled to the input of said multivibrator.

No references cited.